US012615116B2

(12) United States Patent
Liu

(10) Patent No.: US 12,615,116 B2
(45) Date of Patent: Apr. 28, 2026

(54) WIRELESS COMMUNICATION METHOD AND APPARATUS, DEVICE, AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 262 days.

(21) Appl. No.: 18/003,832

(22) PCT Filed: Jul. 9, 2020

(86) PCT No.: PCT/CN2020/101116
§ 371 (c)(1),
(2) Date: Dec. 29, 2022

(87) PCT Pub. No.: WO2022/006821
PCT Pub. Date: Jan. 13, 2022

(65) Prior Publication Data
US 2023/0261829 A1      Aug. 17, 2023

(51) Int. Cl.
*H04L 5/00* (2006.01)
*H04W 52/02* (2009.01)
*H04W 84/06* (2009.01)

(52) U.S. Cl.
CPC ....... *H04L 5/0051* (2013.01); *H04W 52/0216* (2013.01); *H04W 52/0229* (2013.01); *H04W 84/06* (2013.01)

(58) Field of Classification Search
None
See application file for complete search history.

(56) References Cited

U.S. PATENT DOCUMENTS 10,498,477 B2 * 12/2019 John Wilson ......... H04L 5/0048
10,548,079 B2 * 1/2020 Lee .......................... H04L 5/005
11,324,076 B2 * 5/2022 Xiong ................... H04L 5/0051
12,035,242 B2 * 7/2024 Wu ........................ H04W 72/23
(Continued)

FOREIGN PATENT DOCUMENTS

CN            110012524 A      7/2019
WO      WO 2019139769 A1      7/2019

OTHER PUBLICATIONS

The First Office Action in Chinese Application No. 202080001471. 8, dated Sep. 22, 2022, 14 pages.
(Continued)

*Primary Examiner* — Chirag G Shah
*Assistant Examiner* — Suk Jin Kang
(74) *Attorney, Agent, or Firm* — Finnegan, Henderson, Farabow, Garrett & Dunner, L.L.P.

(57) ABSTRACT
A method for wireless communication is performed by a satellite and includes: sending configuration information of a tracking reference signal (TRS) of at least one beam to a terminal; wherein the configuration information is at least configured to indicate a first time domain position of the TRS sent by the satellite; the TRS is used for synchronization between the terminal and the satellite; and the first time domain position is configured for the terminal to determine a wake-up time of the terminal in a ratio resource control (RRC) idle state.

13 Claims, 12 Drawing Sheets beam 1          beam 2 tracking reference signal (TRS)
physical downlink control channel
tracking reference signal (TRS)
physical downlink control channel time domain position position 1   position 2   position 3   position 4

(56) References Cited

U.S. PATENT DOCUMENTS

| | | | | |
|---|---|---|---|---|
| 12,167,329 | B2* | 12/2024 | Iyer | H04W 52/0219 |
| 2018/0234197 | A1* | 8/2018 | John Wilson | H04L 5/0051 |
| 2018/0279236 | A1* | 9/2018 | Regunathan | H04B 7/18513 |
| 2018/0323918 | A1* | 11/2018 | Chuang | H04W 72/044 |
| 2019/0165880 | A1* | 5/2019 | Hakola | H04L 1/1854 |
| 2019/0174466 | A1* | 6/2019 | Zhang | H04L 5/0057 |
| 2019/0215117 | A1* | 7/2019 | Lee | H04L 5/0078 |
| 2019/0254069 | A1* | 8/2019 | Ahn | H04L 27/0006 |
| 2020/0037247 | A1* | 1/2020 | Liao | H04W 52/0216 |
| 2020/0146107 | A1* | 5/2020 | Xiong | H04W 68/005 |
| 2021/0153162 | A1* | 5/2021 | Chen | H04W 56/001 |
| 2021/0227496 | A1* | 7/2021 | Ly | H04L 5/0094 |
| 2021/0378000 | A1* | 12/2021 | Zhang | H04L 5/0094 |
| 2022/0014329 | A1* | 1/2022 | Qi | H04W 72/046 |
| 2022/0039009 | A1* | 2/2022 | Iyer | H04L 5/0098 |
| 2022/0200675 | A1* | 6/2022 | Raghavan | H04B 7/088 |
| 2022/0209920 | A1* | 6/2022 | Wu | H04W 52/028 |
| 2023/0019909 | A1* | 1/2023 | Zhang | H04W 76/20 |
| 2023/0078444 | A1* | 3/2023 | Maleki | H04L 5/0094 370/311 |
| 2023/0246764 | A1* | 8/2023 | Laselva | H04L 27/2675 370/329 |
| 2023/0396385 | A1* | 12/2023 | Kwak | H04L 5/0094 |
| 2024/0121047 | A1* | 4/2024 | Li | H04W 72/0446 |
| 2024/0381479 | A1* | 11/2024 | Li | H04W 76/27 |

OTHER PUBLICATIONS

Extended European Search Report issued in Application No. 20944823.2 dated Mar. 11, 2024, 16 pages.
Examination Report for Indian Application No. 202347004538, dated Feb. 19, 2024, 5 pages.
Nokia, Nokia Shanghai Bell, "Discussion of PTRS for NR Supporting NTN," 3GPP TSG RAN WG1 Meeting #93, R1-1806023, Busan, Korea, May 21-25, 2018, 2 pages.
International Search Report and Written Opinion of International Application No. PCT/CN2020/101116, mailed Apr. 9, 2021, 13 pages.

* cited by examiner satellite

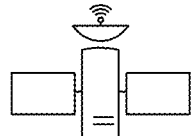

terminal

Step 31, sending configuration information of a TRS of at least one beam to a terminal; the configuration information is at least configured to indicate a first time domain position of the TRS sent by the satellite; the TRS is used for synchronization between the terminal and the satellite; the first time domain position is configured for the terminal to determine a wake-up time of the terminal in a RRC idle state

FIG. 3

43 satellite

41 region 1

42 satellite                                                          terminal

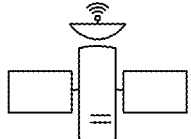                                              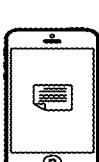

Step 31, sending configuration information of a TRS of at least one
beam to a terminal; the configuration information is at least configured
to indicate a first time domain position of the TRS sent by the satellite;
the TRS is used for synchronization between the terminal and the
satellite; the first time domain position is configured for the terminal to
determine a wake-up time of the terminal in a RRC idle state Step 71, sending the TRS repeatedly at a plurality of first time
domain positions

FIG. 7 satellite terminal

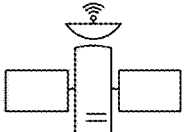

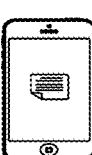

Step 81, receiving configuration information of at least one tracking reference signal TRS of at least one beam sent by a satellite; the configuration information is at least configured to indicate a first time domain position of the TRS sent by the satellite; the TRS is used for synchronization between the terminal and the satellite; the first time domain position is configured for the terminal to determine a wake-up time of the terminal in a RRC idle state

FIG. 8 satellite terminal

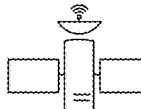

Step 81, receiving configuration information of at least one tracking reference signal TRS of at least one beam sent by a satellite; the configuration information is at least configured to indicate a first time domain position of the TRS sent by the satellite; the TRS is used for synchronization between the terminal and the satellite; the first time domain position is configured for the terminal to determine a wake-up time of the terminal in a RRC idle state Step 91, awaking the terminal at a preset wake-up time prior to the first time domain position, the preset wake-up time is determined according to the first time domain position Step 92, receiving the TRS sent by the satellite at the first time domain position

FIG. 9

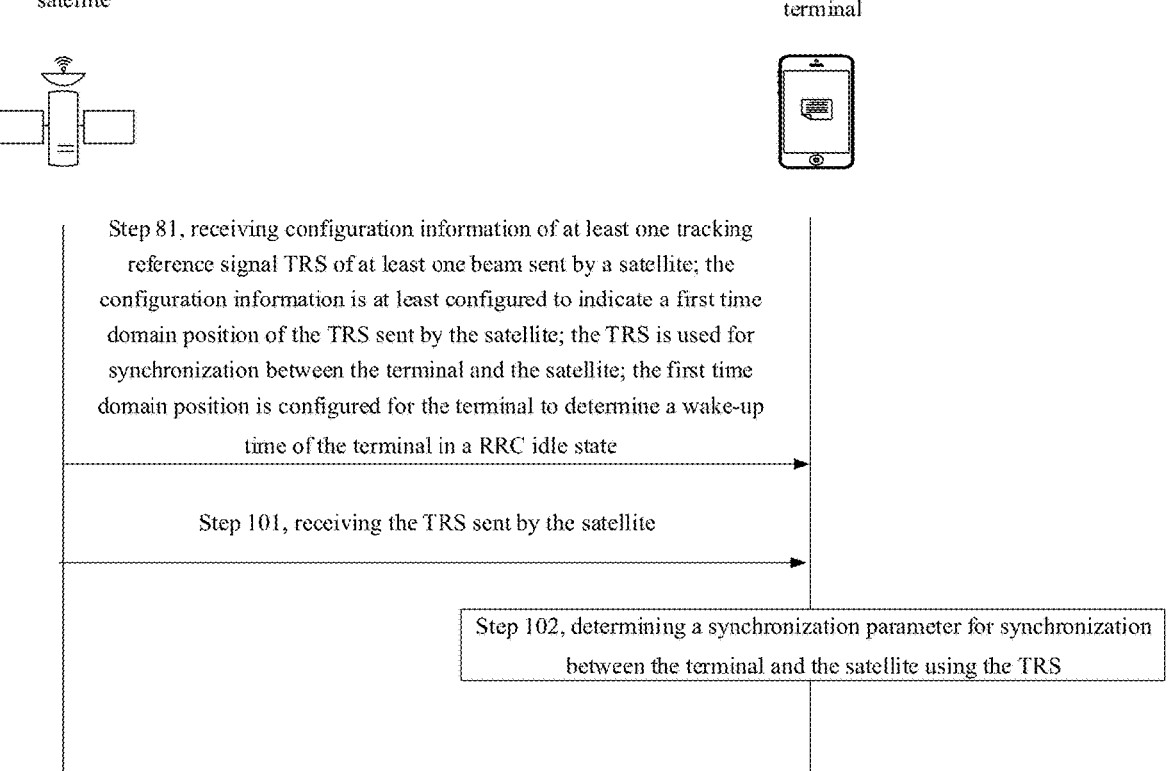

satellite terminal

Step 81, receiving configuration information of at least one tracking reference signal TRS of at least one beam sent by a satellite; the configuration information is at least configured to indicate a first time domain position of the TRS sent by the satellite; the TRS is used for synchronization between the terminal and the satellite; the first time domain position is configured for the terminal to determine a wake-up time of the terminal in a RRC idle state Step 101, receiving the TRS sent by the satellite Step 102, determining a synchronization parameter for synchronization between the terminal and the satellite using the TRS

FIG. 10 satellite                                                                    terminal

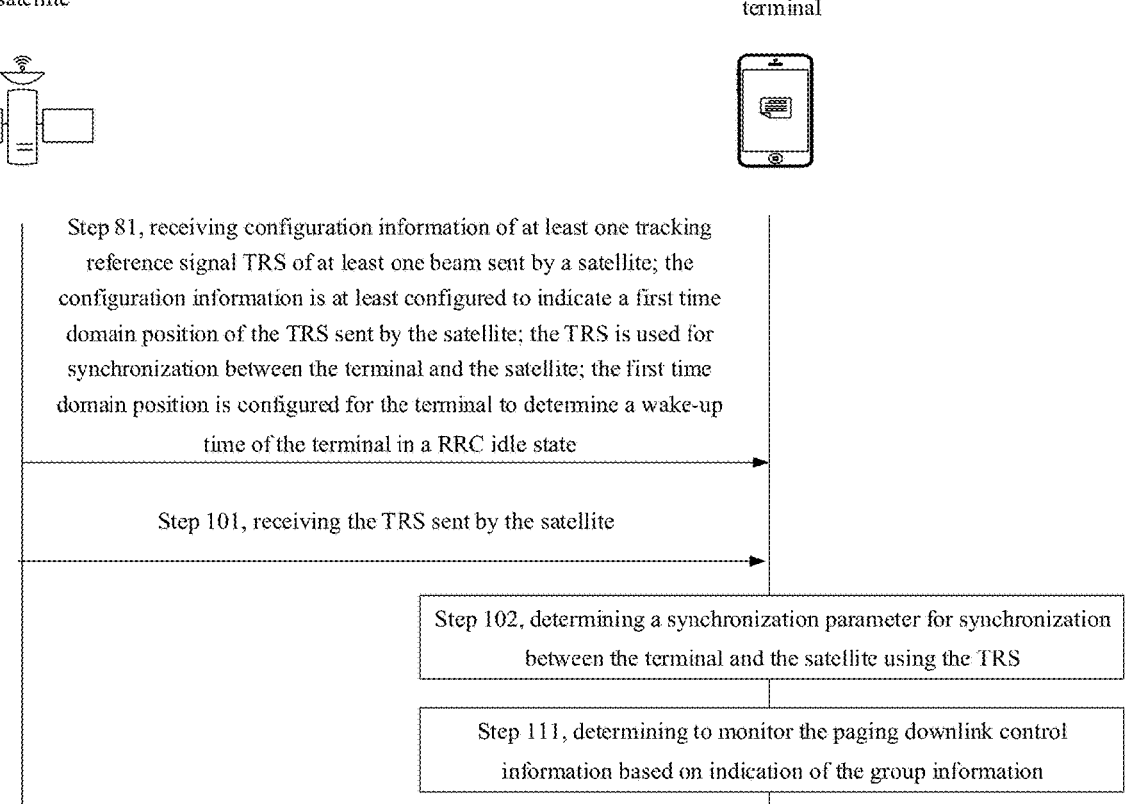

Step 81, receiving configuration information of at least one tracking reference signal TRS of at least one beam sent by a satellite; the configuration information is at least configured to indicate a first time domain position of the TRS sent by the satellite; the TRS is used for synchronization between the terminal and the satellite; the first time domain position is configured for the terminal to determine a wake-up time of the terminal in a RRC idle state Step 101, receiving the TRS sent by the satellite Step 102, determining a synchronization parameter for synchronization between the terminal and the satellite using the TRS Step 111, determining to monitor the paging downlink control information based on indication of the group information

FIG. 11

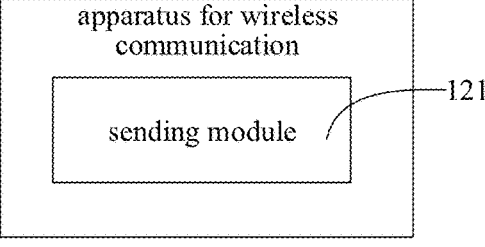

apparatus for wireless communication sending module                    —121

FIG. 12

WIRELESS COMMUNICATION METHOD AND APPARATUS, DEVICE, AND STORAGE MEDIUM

CROSS-REFERENCE TO RELATED APPLICATION

This application is a U.S. national phase of International Application No. PCT/CN2020/101116, filed on Jul. 9, 2020, the entire content of which is incorporated herein by reference.

FIELD

The present disclosure relates to but is not limited to a field of wireless communication technologies, specifically to a method and an apparatus for wireless communication method, a device, and a storage medium.

BACKGROUND

With the continuous development of wireless communication, people put forward the demand of global signal coverage free of dead end, but terrestrial wireless communication cannot meet some application scenarios of this demand (for example, signal coverage of islands and deserts). Therefore, it is necessary to perform signal coverage by satellite. In the terrestrial wireless communication network, all base stations are deployed on the earth. In the non-terrestrial wireless communication network, some or all functions of the base station may be deployed to satellites. The satellite is high in the space, and it is far away from the earth. For example, an operating altitude of geostationary earth orbiting satellites is 35786 km, an operating altitude of low earth orbiting satellites is generally 300-1500 km, and an operating altitude of medium earth orbiting satellites is generally 7000-25000 km.

SUMMARY

Embodiments of the present disclosure provides a method for wireless communication. The method is performed by a satellite and includes:

sending configuration information of a tracking reference signal TRS of at least one beam to a terminal;

the configuration information is at least configured to indicate a first time domain position of the TRS sent by the satellite; the TRS is used for synchronization between the terminal and the satellite; the first time domain position is configured for the terminal to determine a wake-up time of the terminal in a radio resource control RRC idle state.

Embodiments of the present disclosure provide a method for wireless communication. The method is performed by a terminal, and the method includes:

receiving configuration information of at least one tracking reference signal TRS of at least one beam sent by a satellite;

the configuration information is at least configured to indicate a first time domain position of the TRS sent by the satellite; the TRS is used for synchronization between the terminal and the satellite; the first time domain position is configured for the terminal to determine a wake-up time of the terminal in a radio resource control RRC idle state.

Embodiments of the present disclosure provide a communication device. The communication device includes:

a processor; and a memory configured to store instructions executable by the processor;

in which, the processor is configured to implement the method according to any of the embodiments of the disclosure when executing the executable the instructions.

Embodiments of the present disclosure provide a computer storage medium having computer executable instructions stored thereon is provided. The method according to any of the embodiments of the disclosure is implemented when the executable instructions are executed by a processor.

BRIEF DESCRIPTION OF THE DRAWINGS

FIG. 3 is a flow chart of a method for wireless communication according to an exemplary embodiment.

FIG. 7 is a flow chart of a method for wireless communication according to an exemplary embodiment.

FIG. 8 is a flow chart of a method for wireless communication according to an exemplary embodiment.

FIG. 9 is a flow chart of a method for wireless communication according to an exemplary embodiment.

FIG. 10 is a flow chart of a method for wireless communication according to an exemplary embodiment.

FIG. 11 is a flow chart of a method for wireless communication according to an exemplary embodiment.

FIG. 12 is a block diagram illustrating an apparatus for wireless communication according to an exemplary embodiment.

DETAILED DESCRIPTION

Exemplary embodiments will be described in detail here, and their examples are shown in the accompanying drawings. When the following description refers to the drawings, unless otherwise indicated, the same number in different drawings indicates the same or similar elements. The implementations described in the following exemplary embodiments do not represent all implementations consistent with the embodiments of the disclosure. On the contrary, they are only examples of devices and methods consistent with some aspects of the embodiments of the disclosure as detailed in the appended claims.

The terms used in the embodiments of the present disclosure are only for the purpose of describing specific embodiments, and are not intended to limit the present disclosure. The singular forms of "one", "said" and "the" used in the present disclosure and the appended claims are also intended to include the majority forms, unless the context clearly indicates other meanings. It should also be understood that the terms "and/or" as used herein refer to and include any or all possible combinations of one or more associated listed items.

It should be understood that although the terms first, second, third, etc. may be used to describe various information in the present disclosure, such information should not be limited to these terms. These terms are only used to distinguish the same type of information from each other. For example, without departing from the scope of the present disclosure, the first information can also be called the second information, and similarly, the second information can also be called the first information. Depending on the context, the word "if" as used here can be interpreted as "when" or "while" or "in response to determining".

For the purpose of brevity and easy understanding, the terms used herein when characterizing a size relationship are "greater than" or "less than". However, for those skilled in the art, it can be understood that the term "greater than" also covers the meaning of "greater than or equal to", and "less than" also covers the meaning of "less than or equal to".

Figure 1:
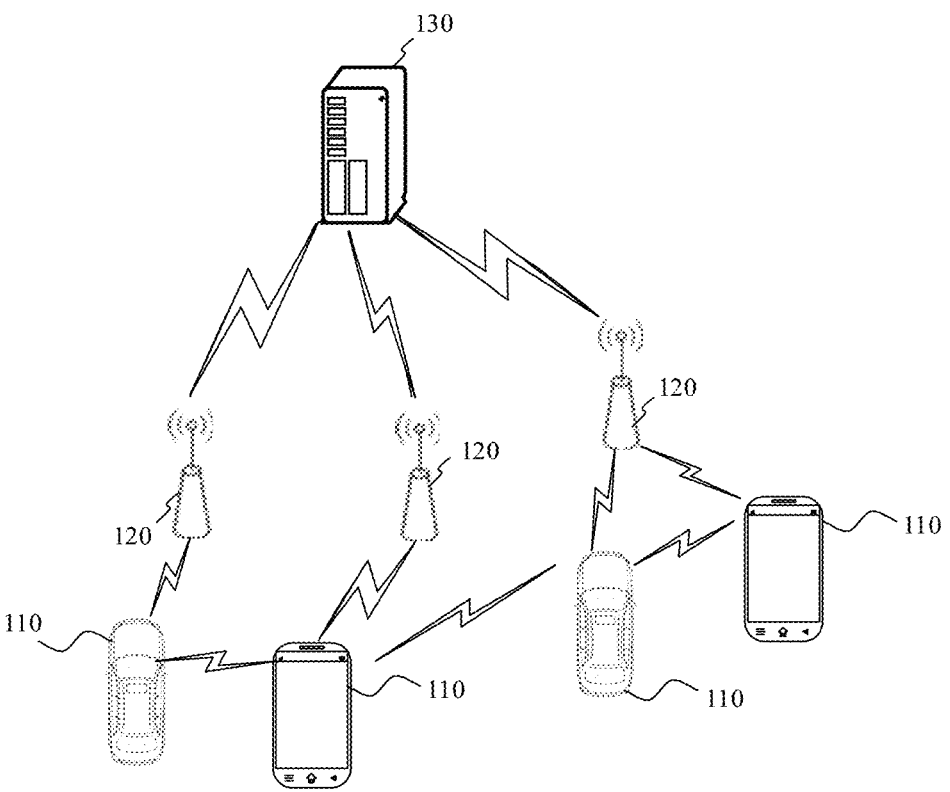
FIG. 1 is a schematic diagram illustrating a structure of a wireless communication system according to an exemplary embodiment.

As illustrated in FIG. 1, it illustrates a block diagram of a wireless communication system provided by an embodiment of the present disclosure. As illustrated in FIG. 1, the wireless communication system is a communication system based on cellular mobile communication technology. The wireless communication system may include several user equipments 110 and several base stations 120.

The user equipment 110 may refer to a device that provides voice and/or data connectivity to a user. The user equipment 110 can communicate with one or more core networks through a radio access network (RAN). The user equipment 110 may be an Internet-of-Things device, such as a sensor device, a mobile phone (also called as "cellular" phone) and a computer with Internet-of-Things device, such as fixed, portable, pocket, handheld, computer built-in or vehicle-mounted devices, for example, a station (STA), a subscriber unit, a subscriber station, a mobile station, a mobile, a remote station, an access point, a remote terminal, an access terminal, a user terminal, a user agent, a user device, or a user equipment (UE). Alternatively, the user equipment 110 can also be the equipment of an unmanned aerial vehicle. Alternatively, the user equipment 110 can also be an on-board device, for example, a trip computer with wireless communication function, or a wireless communication device connected to an external trip computer. Alternatively, the user equipment 110 can also be a roadside device, for example, a streetlamp, a signal lamp or other roadside devices with wireless communication functions.

The base station 120 may be a network side device in the wireless communication system. The wireless communication system can be the fourth generation mobile communication (4G) system, also known as Long Term Evolution (LTE) system. Alternatively, the wireless communication system can also be the fifth generation mobile communication (5G) system, also known as a new radio (NR) system or a 5G NR system. Alternatively, the wireless communication system can also be a next generation system of the 5G system. The access network in the 5G system can be called NG-RAN (new generation radio access network).

The base station 120 can be an evolutionary base station (eNB) used in the 4G system. Alternatively, the base station 120 can also be base station (gNB) adopting a centralized and distributed architecture in the 5G system. When the base station 120 adopts the centralized and distributed architecture, it usually includes a central unit (CU) and at least two distributed units (DU). The central unit is equipped with protocol stacks of a Packet Data Convergence Protocol (PDCP) layer, a Radio Link Control (RLC) layer and a Media Access Control (MAC) layer. The distribution unit is provided with a physical (PHY) layer protocol stack. The embodiments of the present disclosure do not limit the specific implementation mode of the base station 120.

A wireless connection can be established between the base station 120 and the user equipment 110 through a wireless radio. In different embodiments, the wireless radio is a wireless radio based on the fourth generation mobile communication network technology (4G) standard. Alternatively, the wireless radio is a wireless radio based on the fifth generation mobile communication network technology (5G) standard. For example, the wireless radio is a new radio. Alternatively, the wireless radio can also be a wireless radio based on a standard of the next generation mobile communication network technical of 5G.

In some embodiments, an E2E (End to End) connection can also be established between the user equipment 110, such as V2V (vehicle to vehicle) communication, V2I (vehicle to infrastructure) communication and V2P (vehicle to pedestrian) communication in vehicle to everything (V2X) communication.

The above user equipment can be considered as a terminal device in the following embodiments.

In some embodiments, the wireless communication system described above may also include a network management device 130.

Several base stations 120 are connected to the network management device 130 respectively. The network management device 130 can be a core network device in the wireless communication system. For example, the network management device 130 can be a mobility management entity (MME) in an evolved packet core (EPC). Alternatively, the network management device can also be other core network devices, such as a service gateway (SGW), a public data network gateway (PGW), a policy and charging rules function (PCRF) or a home subscriber server (HSS). The embodiments of the present disclosure do not limit the implementation form of the network management device 130.

In order to facilitate the understanding of any embodiment of the present disclosure, first, the wireless communication network is described.

Satellite communication can be the communication between terrestrial radio communication stations using communication satellites as relay stations to transmit radio waves. The communication functions of the communication satellites include at least one of the following: receiving signals, changing the frequency of the signals, amplifying the signals, transmitting signals and positioning.

Figure 2:
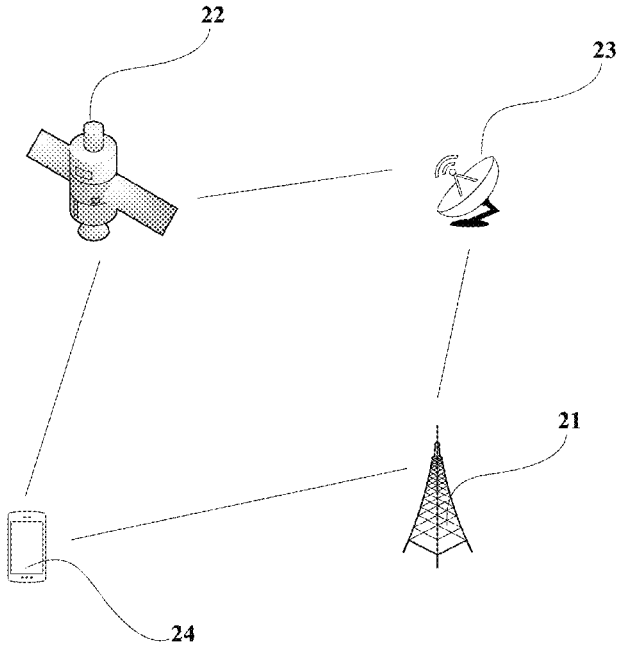
FIG. 2 is a schematic diagram illustrating a structure of a wireless communication system according to an exemplary embodiment.

In an embodiment, as illustrated in FIG. 2, the wireless communication network can be a network integrating mobile communication network and satellite communication network. The mobile communication network includes a base station 21, and the satellite communication network includes a communication satellite 22 and a gateway station 23 of the communication satellite.

In an embodiment, the base station 21 can establish a wireless communication connection with the gateway station 23. The terminal 24 can establish a wireless communication connection with the base station 21. The terminal 24 can establish a wireless communication connection with the satellite 22. Here, the terminal 24 can be a multi-mode terminal, which supports both wireless communication with the satellite 22 and wireless communication with the base station 21.

In the process of communication between the terminal and the satellite, after synchronization is realized based on the primary synchronization signal (PSS) and the secondary synchronization signal (SSS), the time or frequency tracking may be further performed on the channel. A reference signal used for time or frequency tracking is called a tracking reference signal (TRS). The function of the TRS can be divided into two independent aspects:

1. Time domain tracking and time delay spread estimation: a tracking range depends on a frequency domain density of the TRS, and a tracking accuracy depends on a frequency domain bandwidth of the TRS.

2. Frequency domain tracking and Doppler spread estimation: a tracking range depends on a time domain density of the TRS, and a time domain cycle of the TRS.

In the 5G system, the same as in the LTE (Long Term Evolution) system, paging may support functions such as a function of notifying a call coming, as well as a function of notifying a system information update (SI update). Paging is divided into two parts: paging DCI (downlink control information) and a paging message. In addition, the paging DCI is dispatched by downlink control information (DCI) carried by a physical downlink control channel (PDCCH), and the paging message is sent on a physical downlink shared channel (PDSCH) to which it is dispatched. A search space of the PDCCH for dispatching paging DCI is configured by the network side. The terminal may monitor the paging DCI on the physical downlink control channel (PDCCH) at a certain time point. If the paging DCI indicates that a paging message may be sent on some time-frequency resources on the PDSCH, the terminal may decode the paging message on the time-frequency resources to obtain the information about call coming or information about the system information update.

In an NTN (Non Terrestrial Network) architecture based on new ratio (NR), synchronization between a terminal and the base station is worse than that of a terrestrial cellular system due to physical factors such as a transmission channel distance. Under the same terminal hardware conditions, the pre synchronization time for the terminal to accessing to the satellite is longer.

To solve this problem, the present disclosure provides a method for wireless communication method, a device, and a storage medium.

As illustrated in FIG. 3, a method for wireless communication is provided in an embodiment. The method is performed by a satellite and includes:

Step 31, configuration information of a tracking reference signal TRS of at least one beam is sent to a terminal.

The configuration information is at least configured to indicate a first time domain position of the TRS sent by the satellite. The TRS is used for synchronization between the terminal and the satellite. The first time domain position is configured for the terminal to determine a wake-up time of the terminal in a radio resource control (RRC) idle state.

The satellite can be a flying base station. The base station can be an interface device for the terminal to access the network. The base station can be various types of base stations, such as a base station of the third generation mobile communication (3G) network, a base station of the fourth generation mobile communication (4G) network, a base station of the fifth generation mobile communication (5G) network, or other evolutionary base stations. The satellite can be a LEO (Low Earth Orbiting) satellite. It should be noted that, with the evolution of satellite wireless communication network, the satellite can also be a MEO (Medium Earth Orbiting) satellite or a GEO (Geostationary Earth Orbiting) satellite.

In an embodiment, the satellite can be deployed in an airspace where the density of terrestrial base stations is small and the wireless communication environment is poor, such as an airspace where remote mountains and oceans are located.

The terminal can be, but is not limited to, a mobile phone, a wearable device, a vehicle terminal, a road side unit (RSU), a smart home terminal, an industrial sensing device, and/or a medical device.

The terminal can be a multi-mode terminal, which can support both wireless communication with satellites and wireless communication with base stations.

Figure 4:
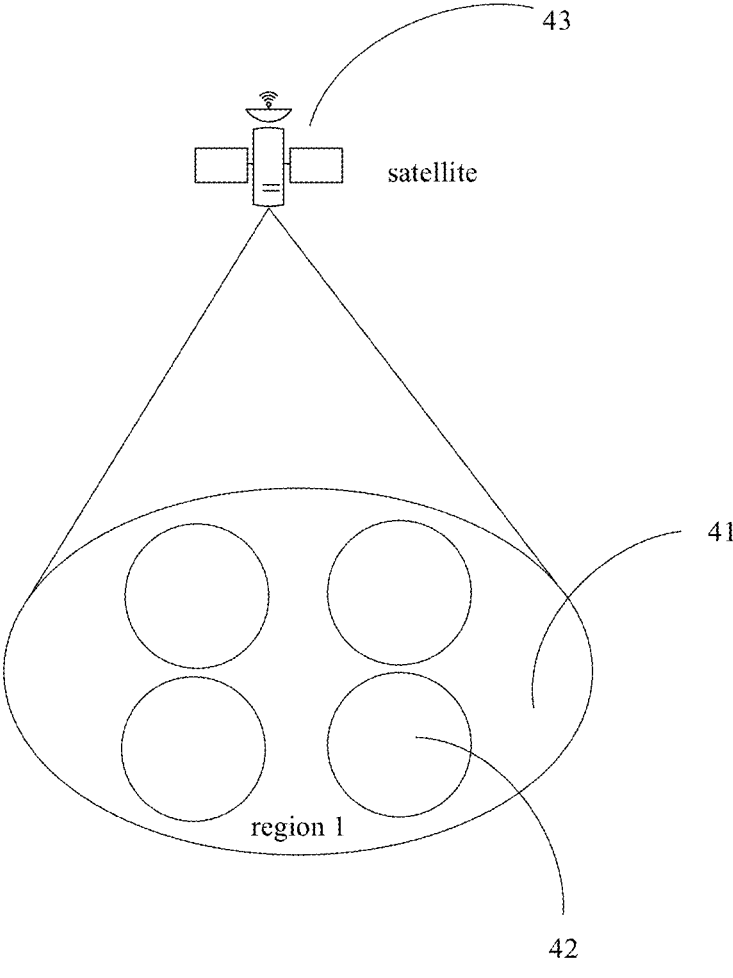
FIG. 4 is a flow chart of a method for sending beams according to an exemplary embodiment.

In an embodiment, as illustrated in FIG. 4, region 1 is a cell 41 covered by a satellite 43. The cell 41 contains multiple satellite beams 42. The terminal may choose a beam with the best wireless communication quality to communicate with the satellite.

In an embodiment, the satellite may send the configuration information to the terminal by unicast. In another embodiment, the satellite may send the configuration information to the terminal by broadcasting.

In an embodiment, the configuration information can be sent to the terminal when the terminal is in a radio resource control (RRC) connected state or in an RRC non-connected state. For terminals in the RRC connected state, the satellite can send the configuration information to the respective terminals through system messages, RRC signaling, or DCI signaling. For terminals in the RRC non-connected state, the satellite can send the configuration information to the respective terminals through the system messages. In this way, the reuse of RRC signaling, system messages or DCI is realized, and the compatibility of signaling is improved.

In an embodiment, when the terminal conducts wireless communication with the satellite, there may be delay in data transmission between the terminal and the satellite. Due to the long distance between the terminal and the satellite, data transmission is affected by uncertain factors (such as propagation media), which may cause the size of the delay to change with time, that is, there is delay jitter. At this time, even if the communication between the terminal and the satellite is synchronized by eliminating the delay, there may be unstable synchronization in the data transmission between the terminal and the satellite due to the existence of delay jitter. Therefore, the satellite can send a tracking reference signal (TRS) to the terminal, and the terminal can further adjust a synchronization parameter based on the TRS to reduce the non synchronization caused by the delay jitter.

In an embodiment, the tracking reference signal (TRS) can be used for the synchronization between the terminal and the satellite. When the terminal and satellite are not synchronized, the terminal can calculate the synchronization parameter for implementing synchronization according to the received tracking reference signal (TRS). The time for transmitting data of terminal and/or satellite can be timely adjusted based on the synchronization parameter, reducing the non synchronization caused by the delay jitter and other factors, and ensure the quality of wireless communication.

In an embodiment, when the terminal determines that the tracking reference signal carries identification information of the terminal according to the received tracking reference signal (TRS), the terminal calculates the synchronization parameter for implementing the synchronization. When it is determined that the reference signal does not carry the identification information of the terminal, calculation of the synchronization parameter for implementing the synchronization is not performed, and the tracking reference signal (TRS) is directly ignored. The terminals in a cell can be divided into multiple groups, and each terminal has group information of its group. The identification information may be the group information.

In an embodiment, the satellite can respectively group the terminals in the radio resource control (RRC) connected state or the terminals in the radio resource control (RRC) non-connected state. For the terminals in the radio resource control (RRC) connected state, the satellite can evenly allocate the terminals to the respective groups according to a maximum number of groups that can be divided and unique identifiers of the currently connected terminals. For the terminals in the radio resource control (RRC) non-connected state, the satellite does not know which terminals dwell in a cell. The satellite can determine which terminals may dwell in the cell according to TAU (Track Area Update) reported by the terminals, and then evenly allocate the terminals to the respective groups according to the maximum number of groups that can be divided and the unique identifiers of the terminals. The unique identifier of the terminal can be a subscriber identity module (SIM) number of a subscriber identity module (SIM) included in the terminal.

In an embodiment, the configuration information of the tracking reference signal (TRS) may be generated by the satellite according to network requirements. For example, in a time period A, the network determines that the delay jitter during wireless communication is large by measuring the delay jitter information of the wireless communication with the terminal, then the configuration information of the tracking reference signal (TRS) can be generated according to the delay jitter information. Generating the configuration information of the tracking reference signal (TRS) can be updating the configuration information of the tracking reference signal (TRS) and generating updated and new configuration information of the tracking reference signal (TRS).

In an embodiment, the satellite can directly acquire the configuration information of the tracking reference signal (TRS) in a preset rule. The preset rule can be a pre configuration in the communication standard.

In an embodiment, the first time domain position may be a frame position, a slot position, and/or a symbol position. In an embodiment, the first time domain position may be located before a position where the satellite sends the paging DCI. For example, the first time domain position may be located before the position where the satellite sends the paging DCI, and the first time domain position is adjacent to the position where the satellite sends the paging DCI.

In an embodiment, the less the time units between the first time domain position and the position where the satellite sends the paging downlink control information, the more the delay jitter of the first time domain position is similar to that of the position where the satellite sends the paging downlink control information, and the more accurate the synchronization parameter determined based on the tracking reference signal (TRS) for implementing synchronization is, making the synchronization between the terminal and the satellite more accurate. The terminal can accurately receive the paging downlink control information sent by the satellite.

In an embodiment, the wake-up time of the terminal in the radio resource control (RRC) idle state can be determined according to the first time domain position. The first time domain position and the wake-up time can be separated by N symbols. N is greater than or equal to zero. For example, the first time domain position and the wake-up time may be separated by two symbols. The first time domain position is located at a position of the fifth symbol of a time slot A, and it can be set that the terminal is awaken at the third symbol of the time slot A. In this way, the terminal can receive the tracking reference signal only by waiting for two symbols, reducing the long waiting time before receiving the tracking reference signal.

In an embodiment, a maximum time interval between the first time domain position and the preset wake-up time may be less than a length of an on duration in a discontinuous reception cycle of a discontinuous reception (DRX) mechanism of the radio resource control (RRC) idle state.

In an embodiment, when the delay jitter of the wireless communication in the network is greater than a set threshold, the number N of symbols between the first time domain position and the wake-up time can be set to be greater than a value a. When the delay jitter of the wireless communication in the network is less than the set threshold, the number N of symbols between the first time domain position and the wake-up time can be set to be less than a value b, where a>b. The smaller the number N of symbols between the first time domain position and the wake-up time, the more accurate the synchronization parameter for implementing synchronization determined according to the tracking reference signal (TRS) is, which makes the synchronization between the terminal and the satellite more accurate, and the terminal and the satellite can transmit data more accurately, so that the data transmission may be more reliable.

Figure 5:
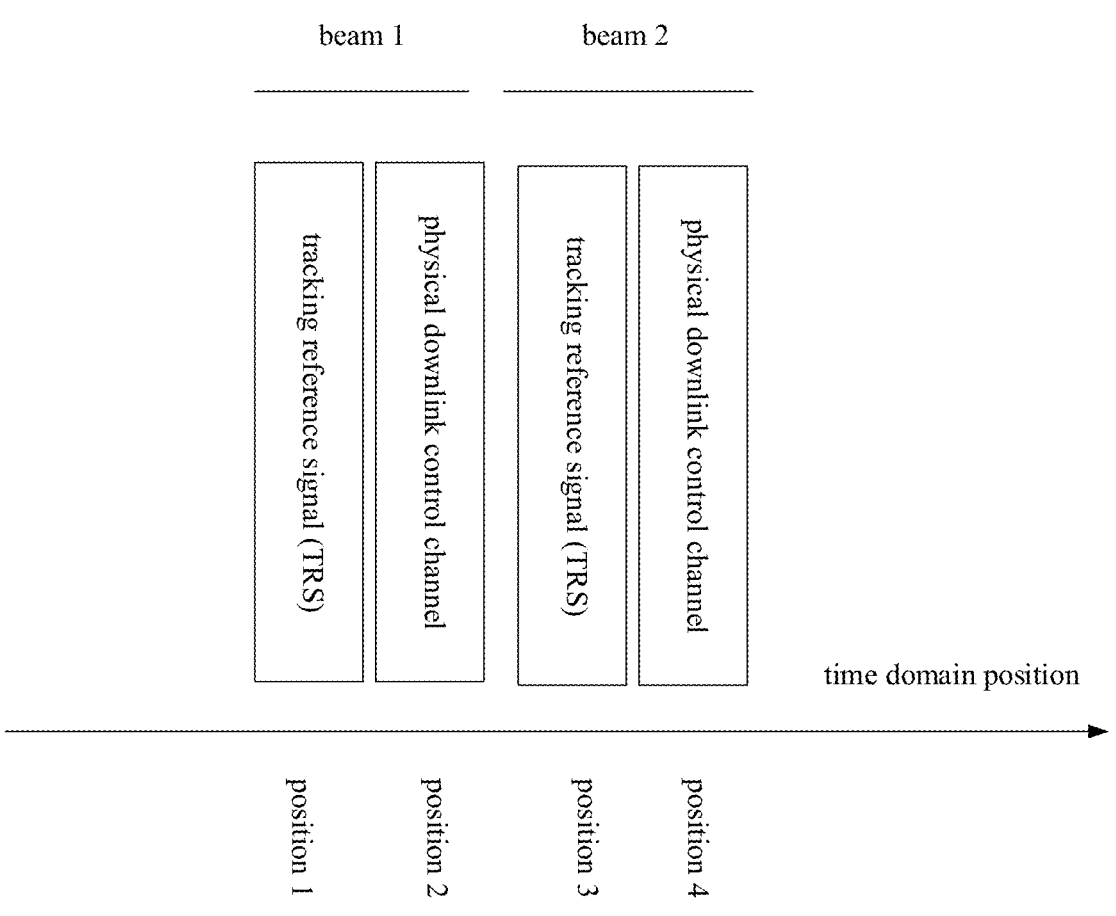
FIG. 5 is a flow chart of a method for wireless communication according to an exemplary embodiment.

In an embodiment, the satellite may send a tracking reference signal (TRS) before sending paging downlink control information to the terminal on each beam. A time domain resource position for sending the paging downlink control information may be adjacent to the first time domain position for sending the tracking reference signal (TRS). As illustrated in FIG. 5, the sending beams includes beam 1 and beam 2. A time domain position for sending the TRS through beam 1 is position 1. A time domain position for sending the paging downlink control information through beam 1 on the physical downlink control channel (PDCCH) is position 2. Position 1 is adjacent to position 2. A time domain position for sending the TRS through beam 2 is position 3. A time domain position of sending the paging downlink control information through beam 2 on the physical downlink control channel (PDCCH) is position 4. Position 3 is adjacent to position 4. The tracking reference signal can carry the group information of the terminal.

Figure 6:
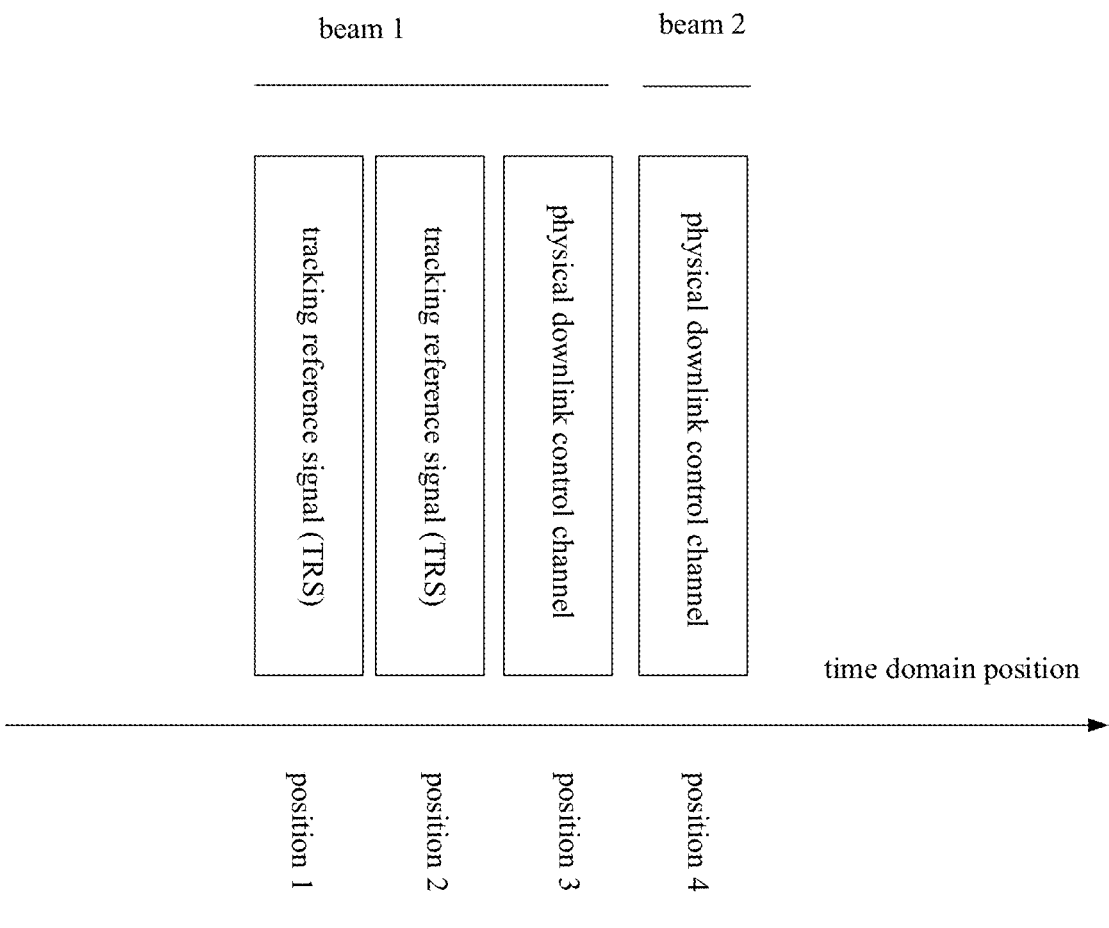
FIG. 6 is a flow chart of a method for wireless communication according to an exemplary embodiment.

In an embodiment, the satellite may repeatedly send the tracking reference signal (TRS) before sending the paging downlink control information to the terminal on the first beam. The time domain resource position for sending the paging downlink control information may be adjacent to the first time domain position for sending the tracking reference signal (TRS). As illustrated in FIG. 6, the sending beams includes beam 1 and beam 2. Time domain positions for sending the TRS through beam 1 are position 1 and position 2 (the second time domain position). A time domain position for sending the paging downlink control information through beam 1 on the physical downlink control channel (PDCCH) is position 3. Position 1 is adjacent to position 2, and position 2 is adjacent to position 3. A time domain position for sending the paging downlink control information on the physical downlink control channel (PDCCH) through beam 2 is position 4. The tracking reference signal can carry the group information of the terminal. The synchronization parameter for synchronization obtained by the terminal based on the received tracking reference signal repeatedly sent by the satellite may be more accurate, making the synchronization between the terminal and the satellite more accurate. The terminal and the satellite can transmit data more accurately, so that the data transmission may be more reliable.

In the embodiments of the present disclosure, after receiving the configuration information, the terminal can determine, before the first time domain position, to wake up the terminal at the wake-up time timely, and the terminal receives the tracking reference signal (TRS) at the first time domain position, and performs synchronization using the tracking reference signal (TRS). Compared with the way of periodically awakening the terminal based on a fixed cycle to detect the tracking reference signal (TRS), the time for detecting the tracking reference signal (TRS) can be shorter, so the synchronization time may be shorter and the power of the terminal may be lower.

In an embodiment, the first time domain position is located before a second time domain position where the satellite sending the paging downlink control information. The paging downlink control information is configured to indicate a time-frequency domain resource for the satellite to send a paging message.

In an embodiment, the paging downlink control information may be sent on the physical downlink control channel (PDCCH). The terminal may monitor the paging downlink control information on the physical downlink control channel (PDCCH). If the paging downlink control information indicates that a paging message may be sent on some time-frequency resources on the physical downlink shared channel (PDSCH), the terminal may decode the paging message on the time-frequency resources to obtain the information about call coming or the information about system information update.

Since the first time domain position is located before the second time domain where the satellite sends the paging downlink control information, the terminal may receive, before monitoring the paging downlink control information on the physical downlink control channel (PDCCH), the tracking reference signal (TRS) after waking up, and may determine the synchronization parameter for implementing synchronization based on the received tracking reference signal (TRS). The terminal may use the synchronization parameter to perform synchronization to synchronize the wireless communication between the terminal and the satellite, so that the paging downlink control information can be obtained more reliably.

As illustrated in FIG. 7, the embodiment provides a method for wireless communication. The method further includes:

Step 71, the TRS is sent repeatedly at a plurality of first time domain positions.

In an embodiment, the tracking reference signal (TRS) may be sent at least twice consecutively. Each time the terminal receives the tracking reference signal (TRS), it can determine the synchronization parameter for implementing synchronization based on the received tracking reference signal (TRS). The synchronization parameter can be an average value of the synchronization parameters obtained twice. The synchronization parameter is used to synchronize the wireless communication between the terminal and the satellite, so that the paging downlink control information can be obtained more reliably.

In an embodiment, the tracking reference signal (TRS) includes grouping information of the terminal. The grouping information is configured to indicate a terminal that monitors the paging downlink control information.

A plurality of terminals can be divided into a plurality of terminal groups, and the group information can be used for terminal grouping. The grouping information includes: a group identifier. The terminal receiving the group information can determine whether to receive the paging downlink control information according to a group where the terminal is located.

In an embodiment, when the terminal receiving the tracking reference signal (TRS) determines that the group information is the group information of the terminal, the terminal monitors the paging downlink control information. Otherwise, the terminal does not monitor the paging downlink control information. For example, a group that terminal A belongs is group A. When the terminal A receives the tracking reference signal (TRS) and determines that the tracking reference signal (TRS) carries the group information "A" of the terminal A, the terminal A may monitor the paging downlink control information. When it is determined that the TRS does not carry the group information "A" of the terminal A, the terminal A may not monitor the paging downlink control information.

As illustrated in FIG. 8, the embodiment provides a method for wireless communication. The method is performed by a terminal, and the method includes:

Step 81, configuration information of at least one tracking reference signal TRS of at least one beam sent by a satellite is received.

The configuration information is at least configured to indicate a first time domain position of the TRS sent by the satellite. The TRS is used for synchronization between the terminal and the satellite. The first time domain position is configured to determine a wake-up time of the terminal in a radio resource control (RRC) idle state.

The satellite can be a flying base station. The base station can be an interface device for the terminal to access the network. The base station can be various types of base stations, such as a base station of the third generation mobile communication (3G) network, a base station of the fourth generation mobile communication (4G) network, a base station of the fifth generation mobile communication (5G) network, or other evolutionary base stations. The satellite can be a LEO (Low Earth Orbiting) satellite. It should be noted that, with the evolution of satellite wireless communication network, the satellite can also be a MEO (Medium Earth Orbiting) satellite or a GEO (Geostationary Earth Orbiting) satellite.

In an embodiment, the satellite can be deployed in an airspace where the density of terrestrial base stations is small and the wireless communication environment is poor, such as an airspace where remote mountains and oceans are located.

The terminal can be, but is not limited to, a mobile phone, a wearable device, a vehicle terminal, a road side unit (RSU), a smart home terminal, an industrial sensing device, and/or a medical device.

The terminal can be a multi-mode terminal, which can support both wireless communication with satellites and wireless communication with base stations.

In an embodiment, as illustrated in FIG. 4 again, region 1 is a cell 41 covered by a satellite 43. The cell 41 contains multiple satellite beams 42. The terminal may choose a beam with the best wireless communication quality to communicate with the satellite.

In an embodiment, the terminal may receive the configuration information sent through unicast by the satellite. In another embodiment, the terminal may receive the configuration information sent through broadcasting by the satellite.

In an embodiment, the configuration information can be sent to the terminal when the terminal is in a radio resource control (RRC) connected state or in an RRC non-connected state. For terminals in the RRC connected state, the satellite can send the configuration information to the respective terminals through system messages, RRC signaling, or DCI signaling. For terminals in the RRC non-connected state, the satellite can send the configuration information to the respective terminals through the system messages. In this way, the reuse of RRC signaling, system messages or DCI is realized, and the compatibility of signaling is improved.

In an embodiment, when the terminal conducts wireless communication with the satellite, there may be delay in data transmission between the terminal and the satellite. Due to the long distance between the terminal and the satellite, data transmission is affected by uncertain factors (such as propagation media), which may cause the size of the delay to change with time, that is, there is delay jitter. At this time, even if the communication between the terminal and the satellite is synchronized by eliminating the delay, there may be unstable synchronization in the data transmission between the terminal and the satellite due to the existence of delay jitter. Therefore, the satellite can send a tracking reference signal (TRS) to the terminal, and the terminal can further adjust a synchronization parameter based on the TRS to reduce the non synchronization caused by the delay jitter.

In an embodiment, the tracking reference signal (TRS) can be used for the synchronization between the terminal and the satellite. When the terminal and satellite are not synchronized, the terminal can calculate the synchronization parameter for implementing synchronization according to the received tracking reference signal (TRS). The time for transmitting data of terminal and/or satellite can be timely adjusted based on the synchronization parameter, reducing the non synchronization caused by the delay jitter and other factors, and ensure the quality of wireless communication.

In an embodiment, when the terminal determines that the tracking reference signal carries identification information of the terminal according to the received tracking reference signal (TRS), the terminal calculates the synchronization parameter for implementing the synchronization. When it is determined that the reference signal does not carry the identification information of the terminal, calculation of the synchronization parameter for implementing the synchronization is not performed, and the tracking reference signal (TRS) is directly ignored. The terminals in a cell can be divided into multiple groups, and each terminal has group information of its group. The identification information may be the group information.

In an embodiment, the satellite can respectively group the terminals in the radio resource control (RRC) connected state or the terminals in the radio resource control (RRC) non-connected state. For the terminals in the radio resource control (RRC) connected state, the satellite can evenly allocate the terminals to the respective groups according to a maximum number of groups that can be divided and unique identifiers of the currently connected terminals. For the terminals in the radio resource control (RRC) non-connected state, the satellite does not know which terminals dwell in a cell. The satellite can determine which terminals may dwell in the cell according to TAU (Track Area Update) reported by the terminals, and then evenly allocate the terminals to the respective groups according to the maximum number of groups that can be divided and the unique identifiers of the terminals. The unique identifier of the terminal can be a subscriber identity module (SIM) number of a subscriber identity module (SIM) included in the terminal.

In an embodiment, the configuration information of the tracking reference signal (TRS) may be generated by the satellite according to network requirements. For example, in a time period A, the network determines that the delay jitter during wireless communication is large by measuring the delay jitter information of the wireless communication with the terminal, then the configuration information of the tracking reference signal (TRS) can be generated according to the delay jitter information. Generating the configuration information of the tracking reference signal (TRS) can be updating the configuration information of the tracking reference signal (TRS) and generating updated and new configuration information of the tracking reference signal (TRS).

In an embodiment, the satellite can directly acquire the configuration information of the tracking reference signal (TRS) in a preset rule. The preset rule can be a pre configuration in the communication standard.

In an embodiment, the first time domain position may be a frame position, a slot position, and/or a symbol position. In an embodiment, the first time domain position may be located before a position where the satellite sends the paging DCI. For example, the first time domain position may be located before the position where the satellite sends the paging DCI, and the first time domain position is adjacent to the position where the satellite sends the paging DCI.

In an embodiment, the less the time units between the first time domain position and the position where the satellite sends the paging downlink control information, the more the delay jitter of the first time domain position is similar to that of the position where the satellite sends the paging downlink control information, and the more accurate the synchronization parameter determined based on the tracking reference signal (TRS) for implementing synchronization is, making the synchronization between the terminal and the satellite more accurate. The terminal can accurately receive the paging downlink control information sent by the satellite.

In an embodiment, the wake-up time of the terminal in the radio resource control (RRC) idle state can be determined according to the first time domain position. The first time domain position and the wake-up time can be separated by N symbols. N is greater than or equal to zero. For example, the first time domain position and the wake-up time may be separated by two symbols. The first time domain position is located at a position of the fifth symbol of a time slot A, and it can be set that the terminal is awaken at the third symbol of the time slot A. In this way, the terminal can receive the tracking reference signal only by waiting for two symbols, reducing the long waiting time before receiving the tracking reference signal.

In an embodiment, when the delay jitter of the wireless communication in the network is greater than a set threshold, the number N of symbols between the first time domain position and the wake-up time can be set to be greater than a value a. When the delay jitter of the wireless communication in the network is less than the set threshold, the number N of symbols between the first time domain position and the wake-up time can be set to be less than a value b, where a>b. The smaller the number N of symbols between the first time domain position and the wake-up time, the more accurate the synchronization parameter for implementing synchronization determined according to the tracking reference signal (TRS) is, which makes the synchronization between the terminal and the satellite more accurate, and the terminal and the satellite can transmit data more accurately, so that the data transmission may be more reliable.

In an embodiment, the satellite may send a tracking reference signal (TRS) before sending paging downlink control information to the terminal on each beam. A time domain resource position for sending the paging downlink control information may be adjacent to the first time domain position for sending the tracking reference signal (TRS). As illustrated in FIG. 5 again, the sending beams includes beam 1 and beam 2. A time domain position for sending the TRS through beam 1 is position 1. A time domain position for sending the paging downlink control information through beam 1 on the physical downlink control channel (PDCCH) is position 2. Position 1 is adjacent to position 2. A time domain position for sending the TRS through beam 2 is position 3. A time domain position of sending the paging downlink control information through beam 2 on the physical downlink control channel (PDCCH) is position 4. Position 3 is adjacent to position 4. The tracking reference signal can carry the group information of the terminal.

In an embodiment, the satellite may repeatedly send the tracking reference signal (TRS) before sending the paging downlink control information to the terminal on the first beam. The time domain resource position for sending the paging downlink control information may be adjacent to the first time domain position for sending the tracking reference signal (TRS). As illustrated in FIG. 6 again, the sending beams includes beam 1 and beam 2. Time domain positions for sending the TRS through beam 1 are position 1 and position 2. A time domain position for sending the paging downlink control information through beam 1 on the physical downlink control channel (PDCCH) is position 3. Position 1 is adjacent to position 2, and position 2 is adjacent to position 3. A time domain position for sending the paging downlink control information on the physical downlink control channel (PDCCH) through beam 2 is position 4. The tracking reference signal can carry the group information of the terminal. The synchronization parameter for synchronization obtained by the terminal based on the received tracking reference signal repeatedly sent by the satellite may be more accurate, making the synchronization between the terminal and the satellite more accurate. The terminal and the satellite can transmit data more accurately, so that the data transmission may be more reliable.

In the embodiments of the present disclosure, after receiving the configuration information, the terminal can determine, before the first time domain position, to wake up the terminal at the wake-up time timely, and the terminal receives the tracking reference signal (TRS) at the first time domain position, and performs synchronization using the tracking reference signal (TRS). Compared with the way of periodically awakening the terminal based on a fixed cycle to detect the tracking reference signal (TRS), the time for detecting the tracking reference signal (TRS) can be shorter, so the synchronization time may be shorter and the power of the terminal may be lower.

As illustrated in FIG. 9, the embodiment provides a method for wireless communication. The method further includes:

Step 91, the terminal is awaken at a preset wake-up time prior to the first time domain position. The preset wake-up time is determined according to the first time domain position.

In an embodiment, the preset wake-up time of the terminal in the radio resource control (RRC) idle state can be determined according to the first time domain position. The first time domain position and the preset wake-up time can be separated by N symbols. N is greater than or equal to zero. For example, the first time domain position and the preset wake-up time may be separated by two symbols. The first time domain position is located at a position of the fifth symbol of a time slot A, and it can be set that the terminal is awaken at the third symbol of the time slot A. In this way, the terminal can receive the tracking reference signal only by waiting for two symbols, reducing the long waiting time before receiving the tracking reference signal.

In an embodiment, a maximum time interval between the first time domain position and the preset wake-up time may be less than a length of an on duration in a discontinuous reception cycle of a discontinuous reception (DRX) mechanism of the radio resource control (RRC) idle state.

In an embodiment, when the delay jitter of the wireless communication in the network is greater than a set threshold, the number N of symbols between the first time domain position and the preset wake-up time can be set to be greater than a value a. When the delay jitter of the wireless communication in the network is less than the set threshold, the number N of symbols between the first time domain position and the preset wake-up time can be set to be less than a value b, where a>b. The smaller the number N of symbols between the first time domain position and the preset wake-up time, the more accurate the synchronization parameter for implementing synchronization determined according to the tracking reference signal (TRS) is, which makes the synchronization between the terminal and the satellite more accurate, and the terminal and the satellite can transmit data more accurately, so that the data transmission may be more reliable.

Step 92, the TRS sent by the satellite is received at the first time domain position.

In an embodiment, the terminal may repeatedly receive the tracking reference signal (TRS) sent by the satellite at the first time domain position.

In an embodiment, the terminal may receive the tracking reference signal (TRS) sent by the satellite at least twice consecutively. Each time the terminal receives the tracking reference signal (TRS), it can determine the synchronization parameter for implementing synchronization based on the received tracking reference signal (TRS). The synchronization parameter can be an average value of the synchronization parameters obtained twice. The synchronization parameter is used to synchronize the wireless communication between the terminal and the satellite, so that the paging downlink control information can be obtained more reliably.

In an embodiment, the first time domain position is located before a second time domain position where the satellite sends paging downlink control information. The paging downlink control information is configured to indicate a time-frequency domain resource for the satellite to send a paging message.

In an embodiment, the paging downlink control information may be sent on the physical downlink control channel (PDCCH). The terminal may monitor the paging downlink control information on the physical downlink control channel (PDCCH). If the paging downlink control information indicates that a paging message may be sent on some time-frequency resources on the physical downlink shared channel (PDSCH), the terminal may decode the paging message on the time-frequency resources to obtain the information about call coming or the information about system information update.

Since the first time domain position is located before the second time domain where the satellite sends the paging downlink control information, the terminal may receive, before monitoring the paging downlink control information on the physical downlink control channel (PDCCH), the tracking reference signal (TRS) after waking up, and may determine the synchronization parameter for implementing synchronization based on the received tracking reference signal (TRS). The terminal may use the synchronization parameter to perform synchronization to synchronize the wireless communication between the terminal and the satellite, so that the paging downlink control information can be obtained more reliably.

As illustrated in FIG. 10, the embodiment provides a method for wireless communication. The method further includes:

Step 101, the TRS sent by the satellite is received.

In an embodiment, the terminal may be awakened at a position 2 symbols before the first time domain position, and the terminal receives the tracking reference signal (TRS) repeatedly sent by the satellite at the first time domain position.

Step 102, a synchronization parameter for synchronization between the terminal and the satellite is determined using the TRS.

In an embodiment, when the satellite repeatedly send the tracking reference signal (TRS) at the first time domain position, the terminal may determine the synchronization parameter for implementing synchronization based on the received tracking reference signal (TRS) each time receiving the tracking reference signal (TRS). The synchronization parameter can be an average value of the synchronization parameters obtained twice. The synchronization parameter is used to synchronize the wireless communication between the terminal and the satellite, so that the paging downlink control information can be obtained more reliably.

As illustrated in FIG. 11, the embodiment provides a method for wireless communication. The TRS contains grouping information of the terminal, and the method further includes:

Step 111, it is determined to monitor the paging downlink control information based on indication of the group information.

A plurality of terminals can be divided into a plurality of terminal groups, and the group information can be used for terminal grouping. The grouping information includes: a group identifier. The terminal receiving the group information can determine whether to receive the paging downlink control information according to a group where the terminal is located.

In an embodiment, when the terminal receiving the tracking reference signal (TRS) determines that the group information is the group information of the terminal, the terminal monitors the paging downlink control information. Otherwise, the terminal does not monitor the paging downlink control information. For example, a group that terminal A belongs is group A. When the terminal A receives the tracking reference signal (TRS) and determines that the tracking reference signal (TRS) carries the group information "A" of the terminal A, the terminal A may monitor the paging downlink control information. When it is determined that the TRS does not carry the group information "A" of the terminal A, the terminal A may not monitor the paging downlink control information.

As illustrated in FIG. 12, the embodiment provides an apparatus for wireless communication. The apparatus is implemented by a satellite, and the apparatus includes a sending module 121.

The sending module is configured to send configuration information of a tracking reference signal TRS of at least one beam to a terminal.

The configuration information is at least configured to indicate a first time domain position of the TRS sent by the satellite. The TRS is used for synchronization between the terminal and the satellite. The first time domain position is configured for the terminal to determine a wake-up time of the terminal in a radio resource control (RRC) idle state.

In an embodiment, the first time domain position is located before a second time domain position where the satellite sends paging downlink control information; in which the paging downlink control information is configured to indicate a time-frequency domain resource for the satellite to send a paging message.

In an embodiment, the sending module 121 is configured to: send the TRS repeatedly at a plurality of first time domain positions.

In an embodiment, the TRS contains grouping information of the terminal; in which the grouping information is configured to indicate a terminal monitoring the paging downlink control information.

Figure 13:
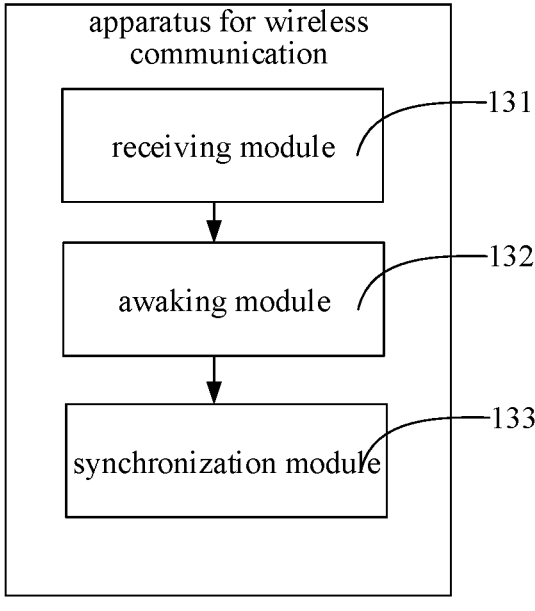
FIG. 13 is a block diagram illustrating an apparatus for wireless communication according to an exemplary embodiment.

As illustrated in FIG. 13, the embodiment provides an apparatus for wireless communication. The apparatus is implemented by a terminal, and the apparatus includes a receiving module.

The receiving module 131 is configured to receive configuration information of at least one tracking reference signal TRS of at least one beam sent by a satellite.

The configuration information is at least configured to indicate a first time domain position of the TRS sent by the satellite. The TRS is used for synchronization between the terminal and the satellite. The first time domain position is configured for the terminal to determine a wake-up time of the terminal in a radio resource control (RRC) idle state.

In an embodiment, the apparatus further includes an awaking module 132.

The awaking module 132 is configured to awake the terminal at a preset wake-up time prior to the first time domain position; in which, the preset wake-up time is determined according to the first time domain position.

The receiving module 131 is configured to receive the TRS sent by the satellite at the first time domain position.

In an embodiment, the first time domain position is located before a second time domain position where the satellite sends paging downlink control information; the paging downlink control information is configured to indicate a time-frequency domain resource for the satellite to send a paging message.

In an embodiment, the apparatus further includes a synchronization module 133.

The receiving module 131 is configured to receive the TRS sent by the satellite; and The synchronization module 133 is configured to determine a synchronization parameter for synchronization between the terminal and the satellite using the TRS.

In an embodiment, the TRS contains grouping information of the terminal, the apparatus further includes a monitoring module (not shown). The monitoring module is configured to determine to monitor the paging downlink control information based on indication of the group information.

As for the apparatus in the above embodiments, the specific mode of each module to perform the operation has been described in detail in the embodiments of the related method, and will not be described in detail here.

Embodiments of the present disclosure further provides a communication device. The communication device includes:

an antenna;

a memory; and a processor, respectively connected with the antenna and the memory, and configured to control the antenna the receiving and sending wireless signals by executing computer executable instructions stored on the memory, and to implement the method for wireless communication provided in any one of the aforementioned embodiments The communication device provided in this embodiment can be the aforementioned terminal or base station. The terminal can be various passenger terminals or vehicle terminals. The base stations can be various types of base stations, such as 4G base stations or 5G base stations.

The antenna can be various types of antennas, such as 3G antenna, 4G antenna or 5G antenna and other mobile antennas. The antenna can also include: Wi-Fi antenna or wireless charging antenna, etc.

The memory may include various types of storage media, which are non-transitory computer storage media and can continue to store information on the communication device after power off.

A processor may be connected to the antenna and memory via a bus or the like for reading executable programs stored on the memory, for example, at least one of the methods shown in any embodiment of the present disclosure.

The embodiments of the present disclosure also provide a non-transitory computer-readable storage medium, in which an executable program is stored. When the executable program is executed by a processor, the steps of the method for accessing a wireless network provided by any of the aforementioned embodiments, for example, at least one of the methods shown in any of the embodiments of the present disclosure, are implemented.

Figure 14:
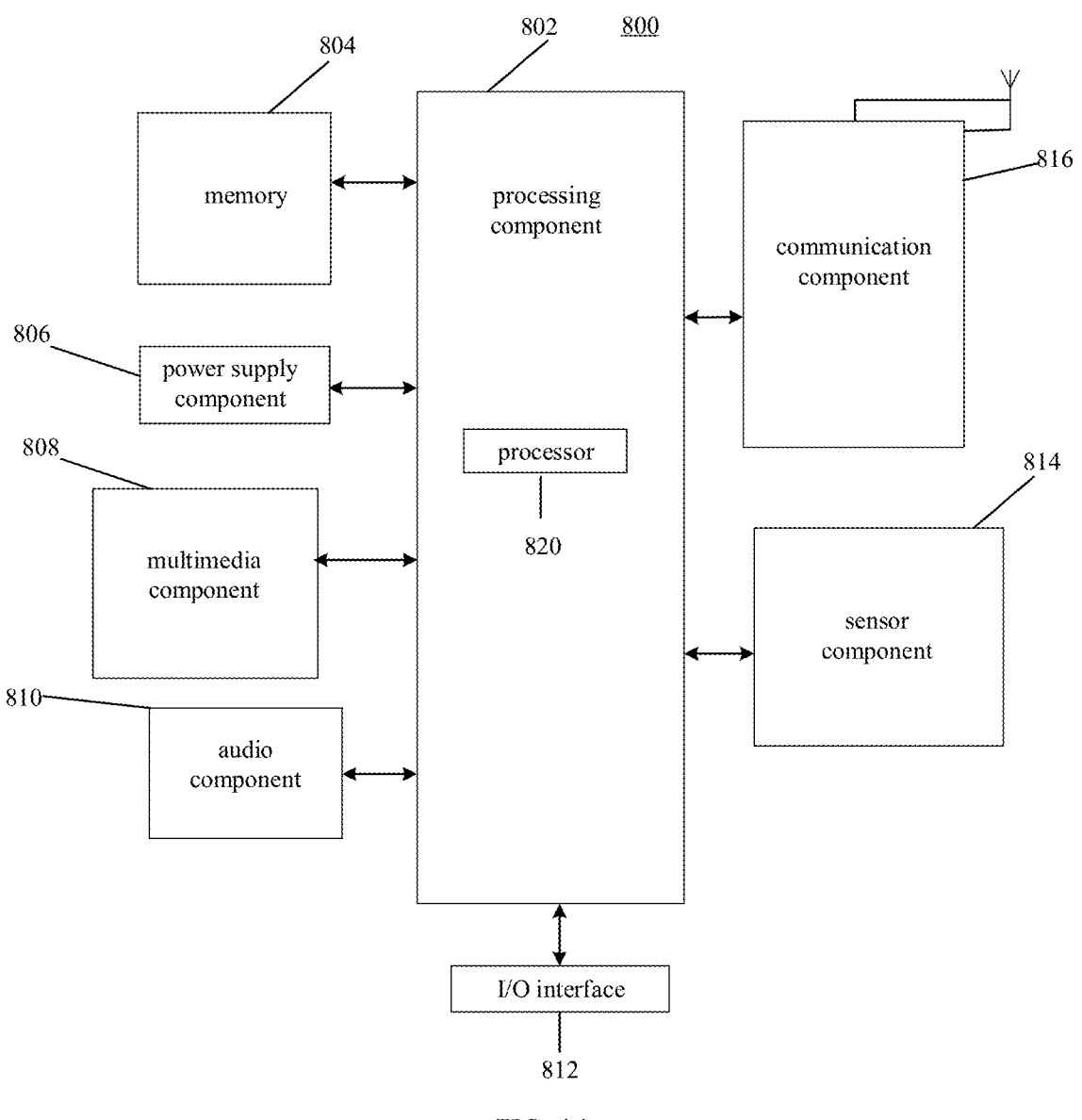
FIG. 14 is a schematic diagram illustrating a structure of a terminal according to an exemplary embodiment.

FIG. 14 is a schematic diagram illustrating a structure of a terminal according to an exemplary embodiment.

As illustrated in FIG. 14, the embodiment provides a terminal 800. The terminal may be terminals such as a mobile phone, a computer, a digital broadcasting terminal, a messaging device, a game console, a tablet device, a medical equipment, a fitness equipment, a personal digital assistant, and so on.

Referring to FIG. 14, the terminal 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the terminal 800, such as the operations related to display, phone call, data communication, camera operation and recording operation. The processing component 802 may include one or more processors 820 to perform instructions, to complete all or part of steps of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store various types of data to support the operation of the terminal 800. Examples of the data include the instructions of any applications or methods operated on the terminal 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the terminal 800. The power supply component 806 may include a power supply management system, one or more power supplies, and other components related to generating, managing and distributing power for the terminal 800.

The multimedia component 808 includes a screen provided an output interface between the terminal 800 and the user. In some embodiments, the screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the terminal 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the terminal 800 is in an operation mode, such as a call mode, a record mode, and a speech recognition mode, the microphone is configured to receive an external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include is but not limited to a home button, a volume button, a start button and a lock button.

The sensor component 814 includes one or more sensors, configured to provide various aspects of status assessment for the terminal 800. For example, the sensor component 814 may detect the on/off state of the terminal 800 and the relative positioning of the component. For example, the component is a display and a keypad of the terminal 800. The sensor component 814 may further detect the location change of the terminal 800 or one component of the terminal 800, the presence or absence of contact between the user and the terminal 800, the orientation or acceleration/deceleration of the terminal 800, and the temperature change of the terminal 800. The sensor component 814 may include a proximity sensor configured to detect the existence of the objects nearby without any physical contact. The sensor component 814 may further include a light sensor such as a complementary metal oxide semiconductor (CMOS) or a charge-coupled device (CCD) image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the terminal 800 and other devices. The terminal 800 may access wireless networks based on communication standard, such as Wi-Fi, 2G or 3G, or their combination. In an embodiment, the communication component 816 receives broadcast signals from an external broadcast management system or broadcast related information via a broadcast channel. In an embodiment, the communication component 816 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the terminal 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes instructions, such as the memory 804 including instructions, the instructions may be executed by the processor 820 of the terminal 800 to complete the above methods. For example, the non-transitory computer-readable storage medium may be a ROM, a random access memory (RAM), a CD-ROM, a magnetic tape, a floppy disk, an optical data storage device, etc.

The terminal can be used to implement the aforementioned method, for example, the method of any embodiment of the present disclosure.

Figure 15:
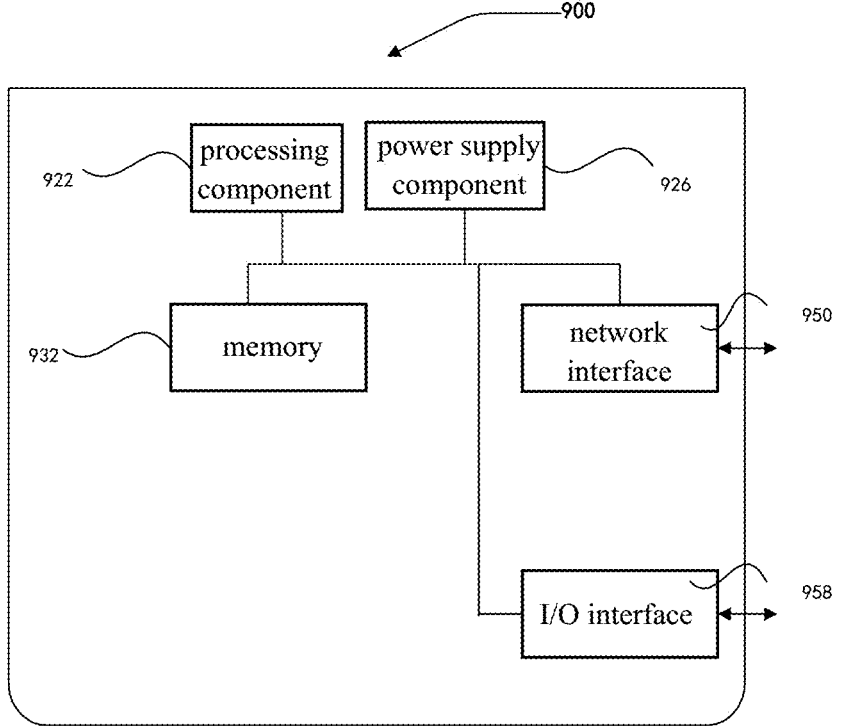
FIG. 15 is a schematic diagram illustrating a structure of a base station according to an exemplary embodiment.

As shown in FIG. 15, an embodiment of the present disclosure provides a structure of a base station. For example, the base station 900 may be provided as a network side device. Referring to FIG. 15, the base station 900 includes a processing component 922, which further includes one or more processors, and a memory resource represented by a memory 932 for storing instructions, such as application programs, that can be executed by the processing component 922. Application programs stored in the memory 932 may include one or more modules each corresponding to a set of instructions. Further, the processing component 922 is configured to execute instructions to execute any of the methods described above, such as a method according to any embodiment of the present disclosure.

The base station 900 may also include a power supply component 926 configured to perform power management of the base station 900, a wired or wireless network interface 950 configured to connect the base station 900 to the network, and an input/output (I/O) interface 958. The base station 900 can operate an operating system based on the memory 932, such as Windows Server™, Mac OS X™, Unix™, Linux™, FreeBSD™, or similar.

The wireless network interface 950 includes, but is not limited to, an antenna of the aforementioned communication device. After considering the specification and practicing the disclosure herein, those skilled in the art will easily think of other implementations of embodiments of the disclosure. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

The invention claimed is:

1. A method for wireless communication, performed by a satellite and comprising:
in response to determining that a terminal is in a radio resource control (RRC) connected state, sending configuration information of a tracking reference signal (TRS) of at least one beam to the terminal, wherein the configuration information is at least configured to indicate a first time domain position of the TRS sent by the satellite, the TRS is used for adjusting a synchronization parameter between the terminal and the satellite, and the first time domain position is configured for the terminal to determine a wake-up time of the terminal in a radio resource control (RRC) idle state,
wherein:
in response to the terminal determining that the TRS carries identification information of the terminal, the terminal adjusts the synchronization parameter;
in response to the terminal determining that the TRS does not carry the identification information of the terminal, the terminal ignores the TRS;
in response to a delay jitter of the wireless communication in a network being greater than a set threshold, a number N of symbols between the first time domain position and the wake-up time is set to be greater than a value a, in response to the delay jitter of the wireless communication in the network being less than the set threshold, the number N of symbols between the first time domain position and the wake-up time is set to be less than a value b, wherein a>b;
the configuration information of a tracking reference signal indicates a first beam and a second beam, the satellite transmits a plurality of TRS on the first beam, the UE receives PDCCH on the first beam and the second beam;
the first time domain position is located before a second time domain position where the satellite sends paging downlink control information, and the paging downlink control information is configured to indicate a time-frequency domain resource for the satellite to send a paging message; and
the TRS contains grouping information of the terminal, and the grouping information is configured to indicate a terminal monitoring the paging downlink control information.

2. The method of claim 1, further comprising:
sending the TRS repeatedly at a plurality of first time domain positions.

3. The method of claim 2, wherein the TRS contains grouping information of the terminal; wherein the grouping information is configured to indicate a terminal monitoring the paging downlink control information.

4. A method for wireless communication, performed by a terminal and comprising:

receiving configuration information of at least one tracking reference signal (TRS) of at least one beam sent by a satellite in response to determining that the terminal is in a radio resource control (RRC) connected state, wherein the configuration information is at least configured to indicate a first time domain position of the TRS sent by the satellite, the TRS is used for adjusting a synchronization parameter between the terminal and the satellite, and the first time domain position is configured for the terminal to determine a wake-up time of the terminal in a radio resource control (RRC) idle state;

in response to the terminal determining that the TRS carries identification information of the terminal, adjusting the synchronization parameter; and in response to the terminal determining that the TRS does not carry the identification information of the terminal, ignoring the TRS, wherein:

in response to a delay jitter of the wireless communication in a network being greater than a set threshold, a number N of symbols between the first time domain position and the wake-up time is set to be greater than a value a, in response to the delay jitter of the wireless communication in the network being less than the set threshold, the number N of symbols between the first time domain position and the wake-up time is set to be less than a value b, wherein a>b;

the configuration information of a tracking reference signal indicates a first beam and a second beam, the satellite transmits a plurality of TRS on the first beam, the UE receives PDCCH on the first beam and the second beam;

the first time domain position is located before a second time domain position where the satellite sends paging downlink control information, and the paging downlink control information is configured to indicate a time-frequency domain resource for the satellite to send a paging message; and the TRS contains grouping information of the terminal, and the method further comprises:

determining to monitor the paging downlink control information based on indication of the group information.

5. The method of claim 4, further comprising:

awaking the terminal at a preset wake-up time prior to the first time domain position, wherein the preset wake-up time is determined according to the first time domain position; and receiving the TRS sent by the satellite at the first time domain position.

6. The method of claim 4, further comprising:

receiving the TRS sent by the satellite; and determining a synchronization parameter for synchronization between the terminal and the satellite using the TRS.

7. The method of claim 6, wherein the TRS contains grouping information of the terminal, and the method further comprises:

determining to monitor the paging downlink control information based on indication of the group information.

8. A terminal, comprising:

an antenna;

a memory; and a processor connected with the antenna and the memory, wherein the processor is configured to:

receive configuration information of at least one tracking reference signal (TRS) of at least one beam sent by a satellite in response to determining that the terminal is in a radio resource control (RRC) connected state, wherein the configuration information is at least configured to indicate a first time domain position of the TRS sent by the satellite, the TRS is used for adjusting a synchronization parameter between the terminal and the satellite, and the first time domain position is configured for the terminal to determine a wake-up time of the terminal in a ratio resource control (RRC) idle state;

in response to the terminal determining that the TRS carries identification information of the terminal, adjust the synchronization parameter; and in response to the terminal determining that the TRS does not carry the identification information of the terminal, ignore the TRS, wherein:

in response to a delay jitter of the wireless communication in a network being greater than a set threshold, a number N of symbols between the first time domain position and the wake-up time is set to be greater than a value a, in response to the delay jitter of the wireless communication in the network being less than the set threshold, the number N of symbols between the first time domain position and the wake-up time is set to be less than a value b, wherein a>b;

the configuration information of a tracking reference signal indicates a first beam and a second beam, the satellite transmits a plurality of TRS on the first beam, the UE receives PDCCH on the first beam and the second beam;

the first time domain position is located before a second time domain position where the satellite sends paging downlink control information, and the paging downlink control information is configured to indicate a time-frequency domain resource for the satellite to send a paging message; and the TRS contains grouping information of the terminal, and the processor is further configured to:

determine to monitor the paging downlink control information based on indication of the group information.

9. A non-transitory computer storage medium having computer executable instructions stored thereon, wherein the computer executable instructions are executed by a processor, the processor is caused to perform the method of claim 1.

10. A satellite, comprising:

an antenna;

a memory; and a processor connected with the antenna and the memory, wherein the processor is configured to perform the method of claim 1.

11. The terminal of claim 8, wherein the processor is further configured to:

awake the terminal at a preset wake-up time prior to the first time domain position; wherein the preset wake-up time is determined according to the first time domain position; and receive the TRS sent by the satellite at the first time domain position.

12. The terminal of claim 8, wherein the processor is further configured to:

receive the TRS sent by the satellite; and determine a synchronization parameter for synchroniza-
tion between the terminal and the satellite using the
TRS.

13. The terminal of claim 12, wherein the TRS contains
grouping information of the terminal, and the processor is 5
further configured to:

determine to monitor the paging downlink control infor-
mation based on indication of the group information.

\* \* \* \* \*